(12) United States Patent  
Guerenbourg et al.

(10) Patent No.: US 9,297,363 B2
(45) Date of Patent: Mar. 29, 2016

(54) WIND TURBINE MAIN BEARING (75) Inventors: Pierre-Antoine Guerenbourg, Herning (DK); Nigel New, Harrow (GB); Jason Stege, Brande (DK); Kim Thomsen, Ikast (DK)

(73) Assignee: SIEMENS AKTIENGESELLSCHAFT, München (DE)

( * ) Notice: Subject to any disclaimer, the term of this patent is extended or adjusted under 35 U.S.C. 154(b) by 633 days.

(21) Appl. No.: 13/380,116

(22) PCT Filed: Sep. 28, 2009

(86) PCT No.: PCT/EP2009/062483
§ 371 (c)(1),
(2), (4) Date: Dec. 22, 2011

(87) PCT Pub. No.: WO2011/003482
PCT Pub. Date: Jan. 13, 2011

(65) Prior Publication Data
US 2012/0099993 A1 Apr. 26, 2012

Related U.S. Application Data (60) Provisional application No. 61/224,525, filed on Jul. 10, 2009.

(51) Int. Cl.
*F03D 11/00* (2006.01)

(52) U.S. Cl.
CPC ............. *F03D 11/0008* (2013.01); *Y02B 10/30* (2013.01); *Y02E 10/722* (2013.01)

(58) Field of Classification Search
USPC .......................... 415/229, 110; 416/148, 174
See application file for complete search history.

(56) References Cited

U.S. PATENT DOCUMENTS

| 5,271,676 A | 12/1993 | Byrne | |
|---|---|---|---|
| 6,739,756 B2 * | 5/2004 | Miller | 384/117 |
| 2006/0063442 A1 | 3/2006 | Coons | |
| 2010/0021278 A1 * | 1/2010 | Stegemann et al. | 414/629 |
| 2012/0070280 A1 * | 3/2012 | Wadehn | 416/1 |

FOREIGN PATENT DOCUMENTS

| CN | 101289993 A | 10/2008 |
|---|---|---|
| CN | 101331334 A | 12/2008 |
| DE | 10255745 A1 | 6/2004 |
| JP | 496621 U | 8/1992 |
| JP | 3007695 U | 2/1995 |
| JP | 9046957 | 2/1997 |
| JP | 2004293359 A | 10/2004 |

* cited by examiner

*Primary Examiner* — Edward Look
*Assistant Examiner* — Jason Davis (57) ABSTRACT

A wind turbine main bearing realized to bear a shaft of a wind turbine, which shaft is caused to rotate by a number of blades connected to the shaft is disclosed. The wind turbine main bearing includes a fluid bearing with a plurality of bearing pads arranged about the shaft. Also disclosed is a wind turbine with a number of blades connected to a shaft and realized to rotate the shaft, which wind turbine includes as main bearing a wind turbine main bearing. Further described is a method of performing maintenance on a wind turbine, including the steps of halting a rotation of the shaft, operating a lifting arrangement to raise the shaft, and removing a bearing pad of the wind turbine main bearing from the bearing housing of the wind turbine main bearing.

15 Claims, 7 Drawing Sheets

WIND TURBINE MAIN BEARING

CROSS REFERENCE TO RELATED APPLICATIONS

This application is U.S. National Stage of International Application No. PCT/EP2009/062483, filed Sep. 28, 2009 and claims the benefit thereof. The International Application claims the benefits of U.S. provisional application No. 61/224,525 DE filed Jul.10, 2009. All of the applications are incorporated by reference herein in their entirety.

FIELD OF THE INVENTION

The invention describes a wind turbine main bearing. The invention further describes a wind turbine with a wind turbine main bearing and a method of performing maintenance on a wind turbine.

BACKGROUND OF THE INVENTION

Wind turbines used in wind energy converters (also called wind generators) for the production of electric power make a valuable contribution towards obtaining energy from renewable sources. Wind energy converters can be onshore, i.e. land-based, or offshore, i.e. constructed in a coastal area. Onshore wind turbines are surpassed in performance by offshore turbines, since windy conditions generally prevail over the sea, while, depending on their location, land-based wind turbines may be subject to prolonged periods of low wind and therefore relatively lower power output. For this reason, increasing numbers of offshore turbines are being built, and these numbers are expected to increase in future. These developments, along with the larger size of the newer wind turbines, are leading to greater demands on serviceability and robustness. An offshore turbine, for obvious reasons, is more costly to service than a land-based or onshore turbine.

Several different types of wind turbines, or wind energy converters, are in use at present. Many use a main shaft with the hub and blades at one end and a gearbox at the other, but there are alternative designs. For example, the Vestas 3MW V90 uses a combined main bearing and gearbox, i.e. the gearbox is integral to the main bearing, and therefore does not have a main shaft. Another type of wind turbine does not have a gearbox, and the generator rotates with low speed. These wind turbines are called 'direct drive generators' and do not have a main shaft as such. These prior art wind turbines use rolling element bearings as main bearing to support the rotor and blades, and the main shaft if the wind turbine has one.

Typical service issues are the replacement of defective bearings, particularly the main bearing, which must support very high dynamic loads depending on wind turbine size and wind conditions. The load on the main bearing is primarily determined by the combined mass of blades, hub and main shaft, and by the wind speed. These high dynamic loads result in correspondingly large dynamic shaft deflections in wind turbines. The maximum rotational speed of a wind turbine is determined by the turbine size and therefore also the blade size. A larger turbine, with larger blades, gives a lower maximum rotational speed. For example, an existing 2.0 MW turbine has a maximum rotational speed of 19 rpm, while the maximum rotational speed of a 3.6 MW turbine is only 13 rpm. At these low speeds, the dynamic loads exerted on the main shaft and main bearing can be very high, especially in strong wind conditions, where resulting forces in the order of more than 2 MN (Mega Newton) exerted on the bearings are not infrequent. At start-up or shut-down, conditions become even more critical since the rotational speed is extremely low—for example less than 5 rpm—and friction between shaft and main bearing becomes greater. Evidently, the bearing load increases with increasing wind turbine size. The operating conditions combined with the issues that large rolling element bearings are very sensitive to material quality and require correct handling and lubrication make roller bearings or ball bearings more likely to fail during the required lifetime.

Since larger wind turbines are desired because of their overall better system economy, the lifetime and performance of the bearing is becoming a more critical aspect in wind turbine design, especially for offshore wind turbines. The conventional roller bearings are associated with a number of problems. Roller bearings must be machined to a high degree of precision, since any irregularity can quickly lead to material failure. Another major argument against the use of a roller bearing system in the main bearing of a wind turbine is the difficulty associated with its maintenance. Alternatives such as sliding or journal bearings, while being less susceptible than roller bearings to noise and vibration, are also unsuitable because of their intolerance to the edge loading that will occur due to the relatively flexible turbine structure. It is not possible to replace such a bearing, or a bearing part, without first disassembling the drive train. A suitably large external crane is required to lift the hub, blades, shaft and bearing off the turbine. The bearing can then be dismantled and replaced, and the components must then be lifted in place again for assembly. An external crane with the necessary lifting capacity presents a considerable additional expense, particularly for an offshore wind turbine, for which the external crane must be transported (in favourable weather conditions) by ship.

Such maintenance procedures in a wind energy converter are costly and time-consuming, particularly in an offshore location, as the skilled person will appreciate. Also, such maintenance can only be carried out during low-wind conditions. In an offshore location, however, conditions of low wind can be seldom. A turbine with a damaged bearing may then have to be furled for a long period of time until the wind drops, during which time the turbine cannot be used to generate electricity.

In brief, the current bearing systems do not satisfactorily fulfil the requirements of long lifetime and low service when used as the main bearing in a wind turbine.

It is therefore an object of the invention to provide an improved bearing for a wind turbine which avoids the problems mentioned above.

SUMMARY OF THE INVENTION

The object of the invention is achieved by a wind turbine main bearing, a wind turbine, and a method of performing maintenance on a wind turbine.

A wind turbine main bearing according to the invention is realized to bear a shaft of a wind turbine, which shaft is caused to rotate by a number of blades connected to the shaft, and is characterized in that the wind turbine main bearing comprises a fluid bearing with a plurality of bearing pads arranged about the shaft.

The inventive wind turbine main bearing is particularly suitable for bearing the combined weight of the shaft, hub, blades, etc., and dynamic loads exerted on these. Due to a combination of constraints, the maximum allowable rotational speed of the shaft is low. The wind turbine main bearing according to the invention is dimensioned and realized for use in a wind turbine realized to rotate a shaft at a speed in the range of 5 rpm-25 rpm, preferably 5-20 rpm, and most preferably 5-15 rpm.

A fluid bearing is a bearing that supports a load entirely on a thin layer of liquid, usually oil. In the following, the terms 'wind turbine main bearing' and 'fluid bearing' may be used interchangeably without restricting the invention in any way. Fluid bearings are known from turbines such as those used in hydro-electric power generation. Fluid bearings may also be used in marine applications such as ship engines and submarine propeller shafts. However, turbines used in these fields of application are high-speed and low-load applications, i.e. the rotor rotates at a high speed of hundreds of rpm—while the load exerted on the main bearing is generally low and constant, due to the more constant nature of water flow, and such turbines very infrequently undergo start-up or shut-down procedures. In a wind energy converter, however, operating conditions are very different, as outlined in the introduction—comprising low rotational speeds, high loads, and frequent start-up and shut-down. For these reasons, prior art wind turbines used in onshore and offshore locations have not used fluid bearings as main bearings, but have relied on conventional bearings such as roller bearings.

Advantageously, therefore, the inventive fluid bearing for a wind turbine provides a more suitable type of bearing, being less susceptible to bearing failure than the conventional roller bearing, while being considerably easier to maintain. A pad of the fluid bearing, for example, can relatively easily be removed or inserted without having to disassemble the drive train, which must be done in the case of roller bearings in order to access the bearings.

In the following, without restricting the invention in any way, the term 'wind turbine' may be understood to refer to an onshore or offshore wind energy converter. Since the wind turbine according to the invention can comprise a main shaft and a gearbox, or can be a direct drive generator, the terms 'shaft' and 'main shaft' may be used interchangeably without restricting the invention in any way, and are intended to refer to the rotating part supported by the main bearing.

The wind turbine according to the invention comprises as its main bearing a fluid bearing, which fluid bearing comprises a plurality of bearing pads arranged about the rotor shaft of the wind turbine.

In the wind turbine according to the invention, individual pads can be removed or inserted while the remaining pads continue to support the load. The maintenance of such a fluid bearing in a wind turbine according to the invention is therefore considerably easier and quicker than a comparable maintenance of a roller bearing, for which the drive train must first be lifted by a crane and then disassembled in order to access the bearings, as outlined above in the introduction. Therefore, since the fluid bearing of a wind turbine according to the invention is more robust than the conventional type of bearing used up until now in prior art wind turbines, such a wind turbine will require less maintenance, and, when maintenance is required, this can be carried out quicker and with less effort. These reasons make the wind turbine according to the invention particularly advantageous for offshore locations. Because the fluid bearing is more straightforward and economical to manufacture than the conventional roller bearings, which require high-precision machining, the inventive wind turbine is obviously also attractive for onshore locations.

According to the invention, a method of performing maintenance on such a wind turbine comprises the steps of halting a rotation of the shaft, operating a lifting arrangement to raise the shaft, and removing a bearing pad of the wind turbine main bearing from a bearing housing of the wind turbine main bearing. This very straightforward method compares favourably with the much more complicated maintenance procedures necessary in prior art wind turbines having roller bearings as main bearing, and in which an external crane is required to dismantle and lift the hub, blades, shaft and bearing off the turbine. Hereafter the bearing can be replaced and all the components then have to be lifted in place again for assembly. In the method according to the invention, a bearing pad can easily be removed from the bearing housing without disassembling the drive train. An obvious advantage of the method according to the invention is the reduction in costs, since an expensive external crane with high lifting capacity is not required. Also, since maintenance can easily be carried out on the main bearing according to the invention without having to disassemble the drive train, stable low wind speed weather conditions are not absolutely necessary during maintenance. Therefore, the risk of a long down time of the wind turbine during maintenance is very favourably reduced.

Particularly advantageous embodiments and features of the invention are given by the dependent claims, as revealed in the following description.

The power output of a wind energy converter depends to a large extent on its dimensions. Generally, a wind turbine with longer blades and therefore also a larger main shaft can produce more electrical power. Therefore, in a preferred embodiment of the invention, the wind turbine main bearing is realized to bear a shaft with a diameter (in the region of the main bearing) of at least 40 centimetres, more preferably at least 50 cm, and most preferably at least 80 cm. The main bearing is generally positioned around the largest diameter of the shaft, generally at the hub end (the diameter may decrease considerably towards the gearbox end). For example, a 1.3 MW wind turbine can have a shaft diameter of about 55 cm at the main bearing, while a 2.3 MW wind turbine may have a shaft diameter of about 80 cm at the main bearing. The shaft at the main bearing of a 3.6 MW wind turbine can even have a diameter of 100 cm or more. The fluid bearing according to the invention is particularly well suited to bearing the loads of such large turbines as well as any dynamic loads exerted during operation. The fluid bearing according to the invention and used as main bearing should not be confused with conventional fluid bearings used for other purposes in some wind turbines, which may for example also be equipped with a conventional fluid bearing for a part of the drive assembly that is very much smaller in diameter, for example in or beyond the gearbox. An example of such a fluid bearing is the hydrodynamic "Norixlager" manufactured by Main Metall International AG with an inner diameter of at most 6 cm and intended for high-rotational use in the gearbox or generator. As the skilled person will know, such conventional fluid bearings are not designed to operate at the low rotational speeds at which the main shaft rotates in a wind turbine and are not able to withstand the deflections that arise in a wind turbine.

The bearing pads of the fluid bearing are preferably arranged in an outer containing structure or main bearing housing. The bearing pads may be referred to collectively in the following as a 'pad arrangement'. The bearing housing is preferably realized to also contain the fluid used to lubricate the bearing. Such a fluid may be a suitable oil or lubricant with a viscosity of, for example, ISO VG 46-ISO VG 460.

Under ideal conditions, the blades of a wind energy converter cause the rotor to rotate smoothly about its central longitudinal axis. However, some lateral forces may also be exerted on the rotor shaft, which may move and bend to some extent due to the large dynamic loads, and the bearing pads of the fluid bearing should preferably be able to adjust to these movements. Therefore, a fluid bearing according to the invention is preferably realized such that the bearing pad is tiltable to accommodate a deflection of the shaft. There are a number of ways of tiltably mounting bearing pads in an outer bearing housing. For example, the bearing pads and the outer containing structure may be realised essentially in a "one piece" manner, for example by a flexible connector to join the bearing pad to the bearing housing.

In a preferred embodiment of the invention, a bearing pad of the fluid bearing comprises a pivot bearing to tiltably connect the bearing pad to the bearing housing. The pivot bearing can comprise a ball and socket arrangement for each bearing pad, so that the outer surface of the bearing pad comprises a socket, and the "ball" or hemisphere is part of the outer containing structure. These types of fluid bearing are also referred to as 'tilting-pad fluid bearings'. In the following, for the sake of simplicity, the terms 'fluid bearing' and 'tilting-pad fluid bearing' may be used interchangeably without restricting the invention in any way.

A bearing pad for the fluid bearing according to the invention can be symmetric in shape. Alternatively, an asymmetric shape may be preferred. For example, the bearing pad, in cross-section, may exhibit an essentially 'scalene' triangular shape. Such a shape for the bearing pad may allow the bearing pad to better accommodate the dynamic loads exerted on the main shaft during operation.

The fluid bearing according to the invention can be realized as a hydrostatic and/or hydrodynamic bearing. During operation as a hydrodynamic bearing, when the rotor is moving, lubricant is drawn under the bearing pad, which tilts slightly owing to the fluid pressure. The extent of the 'tilt' depends on the load and on the speed of rotation. When the lubricant or fluid is drawn under the bearing pad, a 'wedge' of pressurised fluid is built up between the bearing pad and the rotor.

Furthermore, such hydrodynamic bearings may be subject to increased wear at start-up due the high friction between bearing pad and shaft until enough lubricant has been drawn under the bearing pad. Such start-up friction can decrease the lifetime of the bearing.

Therefore, in a preferred embodiment of the invention, the fluid bearing is realized as a hydrostatic bearing and preferably comprises a bearing pad with a number of cavities located on the inner surface of the bearing pad, wherein a cavity comprises a fluid inlet for the injection of a fluid lubricant to the inner surface of the bearing pad. In this way, the lubricant can be injected under very high pressure directly to the surface of the main shaft under the bearing pad, thus forcing a layer of lubricant between these two surfaces, and allowing the main shaft to move under favourably low friction even at start-up. Since the high-pressure fluid injected between the bearing pad and the main shaft causes the bearing pad to be raised and supported by the fluid film, the pressure is distributed more evenly over the pad, and the load-carrying capacity of the bearing pad is increased as a result. Ultimately, this may prolong the lifetime of the bearing and reduce maintenance effort. In the following, a cavity may also be referred to as a 'pocket' or a 'recess'.

The pressure distribution owing to the fluid between bearing pad and main shaft is not uniform over the inner surface of the bearing pad, but exhibits an area of maximum pressure in a region towards the 'trailing edge' of the bearing pad, caused by the relative rotation between shaft and pad. Therefore, in a particularly preferred embodiment of the invention, the location of a cavity or pocket on the inner surface of a bearing pad is chosen on the basis of a relative pressure distribution on the inner surface of the bearing pad. In this way, the oil injection can occur at a favourable location on the bearing surface. Most preferably, the position of a cavity or pocket coincides with or corresponds to a region of low relative pressure on the inner surface of the bearing pad, so that when fluid is injected into such a cavity, the overall pressure of the fluid over the inner surface of the bearing pad is distributed more evenly. The regions of low pressure can be determined by calculating the pressure profile over a bearing pad, converting this pressure profile into a number of 'isobar contours', and determining the location of low-pressure isobar contours relative to the bearing pad inner surface. The cavities may then preferably be formed on the bearing pad inner surface to follow the isobar contours, more preferably the isobar contours corresponding to low-pressure regions, or to at least partially coincide with them. Fluid can then be more optimally injected onto the inner surface of the bearing pad. For example, in the case where four cavities are arranged in the outer corner regions of an essentially rectangular bearing pad inner surface, fluid injected into these cavities during start-up and/or during operation of the wind turbine result in an essentially even distribution of pressure over the bearing pad inner surface, so that the load borne by the bearing pad is more evenly distributed.

Evidently, the fluid bearing for use in a wind turbine according to the invention may be realized as a hybrid bearing, wherein one or more pads comprise cavities as described above for the injection of fluid at high temperatures, and wherein fluid on the free surface of the rotating main shaft is also drawn under the bearing pads.

The materials used for the bearing pad may be chosen on the basis of the intended function of the wind turbine and its dimensions, which can for example depend on its future location and the conditions under which it will operate. For example, in a wind turbine intended for high power generation and dimensioned accordingly, the load exerted by the rotor on the bearings can be very high, in the order of 2 MN. These loads can be calculated in advance, and the materials can be chosen accordingly. Examples of materials for the bearing may be hardened or polished steel, or steel with a thin coating of white metal (also referred to as 'Babbitt' or 'Babbitt metal').

In a further preferred embodiment of the invention, the inner surface of a bearing pad comprises a polymer lining with a low module of elasticity, for example a material such as PTFE (polytetrafluoroethylene), PVDF (polyvinylidene fluoride), POM (polyoxymethylene), PEEK (polyether ether ketone), etc. These materials exhibit favourable stability and stiffness, are lightweight, have low coefficients of friction, and can be immersed in oil without damage. Use of such a material as an inner surface of the bearing can be advantageous, since a polymer with these properties will deform slightly while under pressure, so that the bearing has more 'give'. This allows a better fluid film thickness to be built up during hydrodynamic operation. The thickness of the polymer layer can depend on the conditions of use of the fluid bearing, and on the dimensions of the bearing pads. For a hydrostatic bearing, the cavities mentioned above can also be cut into or excised from the polymer lining.

The pad arrangement of the fluid bearing for a wind turbine can comprise several bearing pads suitably arranged relative to the rotor and held in place by the outer containing structure. Preferably, at least three bearing pads are arranged about the rotor shaft in a ring or annular arrangement. For example, an annular arrangement can comprise three bearing pads arranged essentially evenly about the rotor and held in place by suitable bearings such as pivot bearings, as already described above. In another preferred embodiment of the invention, the pad arrangement comprises two or more annular arrangements of bearing pads arranged about the rotor shaft. In such a case, for example using two such annular arrangements each with three bearing pads, it may be sufficient to use smaller bearing pads, since the load is distributed over all six bearing pads.

In a further preferred embodiment of the wind turbine according to the invention, the wind turbine comprises a lifting arrangement such as a jack for raising a relevant part such as the main shaft to reduce the load on the main bearing in order to facilitate removal, insertion or maintenance of a bearing pad in the lower region of the bearing housing. Such a simple jack, as the skilled person will appreciate, is quite easily installed in a wind turbine Nacelle housing. Using such a jack, the main shaft or rotor can be lifted and fixed to support the load and hold the shaft stable. Then, since the bearing pads are no longer under any load, they can easily be replaced in one operation. If there are three or more pads in a ring arrangement, one pad at a time can be removed during maintenance while the remaining pads continue to support the shaft or rotor. Use of at least three pads in a ring arrangement is advantageous, since at least two pads are then available to support the shaft while a bearing pad is removed. A bearing pad in the upper region of the bearing housing may be easily removed without raising the main shaft, since the weight of the shaft is borne by the pads in the lower region when the shaft is not rotating.

A wind turbine with a main shaft can have one or more bearings, for example a main bearing comprising a fluid bearing according to the invention positioned at the hub end, where the loads are greatest, and a conventional roller bearing in the gear box supporting the other end of the main shaft. During operation of the wind turbine and depending on wind conditions, axial loads may be also exerted on the shaft. To avoid material damage, the wind turbine preferably comprises a number of thrust bearings arranged for example about the shaft and realized to accommodate such an axial movement of the shaft. These axial loads are generally exerted in a 'downstream' direction, i.e. along the shaft in a direction away from the hub. These thrust bearing pads may also be realized to be tiltable. To absorb loads that may occasionally be exerted in the opposite direction, the wind turbine also preferably comprises a 'bump stop' at the front end of the main shaft, for example at a suitable location between the main bearing and the hub.

Other objects and features of the present invention will become apparent from the following detailed descriptions considered in conjunction with the accompanying drawings. It is to be understood, however, that the drawings are designed solely for the purposes of illustration and not as a definition of the limits of the invention.

BRIEF DESCRIPTION OF THE DRAWINGS

In the drawings, like reference numbers refer to like objects throughout. Objects in the diagrams are not necessarily drawn to scale.

DETAILED DESCRIPTION OF THE EMBODIMENTS

Figure 1:
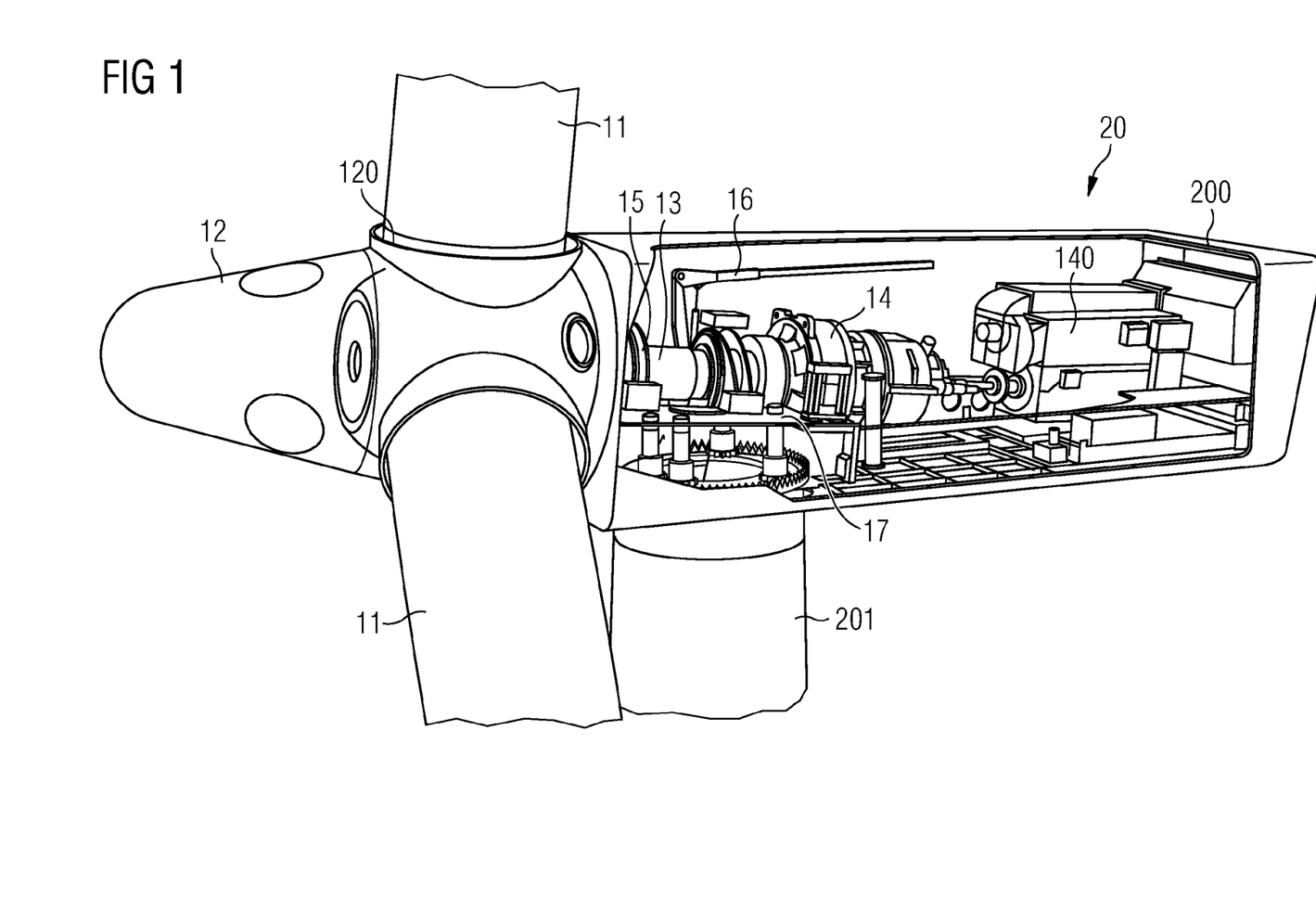
FIG. 1 shows a schematic rendering of the basic elements of an exemplary conventional wind turbine.

FIG. 1 shows a schematic rendering of the basic elements of an exemplary prior art wind turbine 20, in this case a Nacelle arrangement of a wind turbine with a drive train and a gearbox in a housing 200 carried by a tower 201. Only the relevant elements are shown for the sake of clarity.

The blades 11 of the wind turbine 20, usually but not necessarily three in number, are affixed to a hub 12 or spinner 12 by means of a pitch bearing 120 with which the blades 11 can be furled, for example during storm conditions. In normal operation, wind exerts pressure on the blades 11, which cause the spinner 12 and the attached main shaft 13 to rotate. The rotational energy is converted into electrical energy using a gearbox 14 and generator 140. The details of the energy conversion are not of relevance here and therefore will not be explained in further detail. The drive assembly comprising the main shaft 13, gearbox 14 etc. is mounted on a Nacelle bedplate 17. The dimensions of the interior of the Nacelle housing 200 may be in the order of approximately 3 m in height and 10 m in length. The diameter of the main shaft 13 can be in the order of 40 cm-100 cm or even more.

The load exerted by the combined weight of the blades 11, hub 12, main shaft 13 and other elements not specified, and by the forces exerted by the wind is borne largely by a main bearing 15 positioned close to the spinner end of the main shaft 13. An additional bearing (not shown in the diagram) as part of the gear box 14 can carry a minor portion of the load. In conventional wind turbines, the main bearing 15 is a roller bearing. A crane 16 in the Nacelle is used for hoisting small components and tools into the Nacelle during service. For heavier components, or for lifting the hub, blades and shaft, an external crane (not shown in the diagram) is required. Such an external crane must be transported to the wind turbine, as explained in the introduction.

Figure 2:
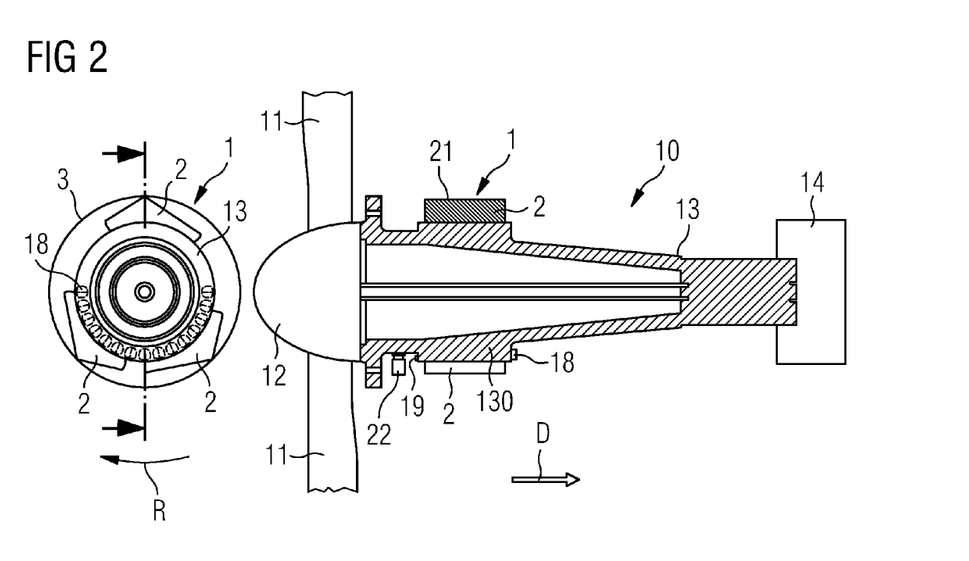
FIG. 2 shows a radial and a longitudinal schematic cross-section through the relevant parts of a wind turbine in a first embodiment of the invention.

FIG. 2 shows a transverse cross-section (left-hand side of the diagram) and a longitudinal cross-section (right-hand side) through the relevant parts of a wind turbine 10 comprising a tilting-pad fluid bearing 1 according to the invention. The longitudinal cross-section on the right is obtained essentially along the broken line shown in the transverse cross-section and shows the blades 11, hub 12, main shaft 13 and gearbox 14. Non-relevant parts such as the Nacelle bedplate, generator etc., have been left out for the sake of clarity, but the skilled person will appreciate that such elements are of course required.

In this embodiment of the wind turbine 10 according to the invention, the main bearing 1 comprises a tilting-pad fluid bearing 1, and the main shaft 13 is shaped to accommodate the bearing pads 2 of the fluid bearing 1 by means of thicker parts giving a cylindrical region 130 of the main shaft 13. To absorb axial loads in the direction D (which corresponds largely to the main wind direction), a number of thrust bearing pads 18 are positioned along the rear outer edge of the 'lower half' of the main shaft, as can be seen clearly in the transverse cross-section. Axial loads in the opposite direction, which are lower and occur less often, can be absorbed by a suitable bump stop 19 positioned at a point on the fore outer edge of the lower half of the main shaft.

In the transverse cross-section on the left-hand side, a first arrangement of bearing pads 2 can be seen, comprising three bearing pads 2 positioned in an annular arrangement around the outer surface of the main shaft 13. In the longitudinal cross-section, only two of the bearing pads 2 can be seen. The shape of the bearing pads 2 is only vaguely indicated in this diagram for the sake of clarity, but will be described in more detail below. Furthermore, the bearing housing 3 is simply indicated as an enclosing circle, but will be described in more detail in FIGS. 3 and 4 below. The bearing pads 2 may be tiltably fixed to the bearing housing 3 by means of a suitable bearing (not shown). The bearing pads are shown to have an asymmetrical cross-section, in the form of a scalene triangle with the outer 'corner' of the triangle (defining the point or axis about which the pad tilts) situated at the bearing housing and with the longer side in the direction of rotation of the shaft. The asymmetrical form of the bearing pads best suits the direction of rotation of the shaft.

The bearing housing 3, which for reasons of clarity is indicated only as a circle in the transverse cross-section, is equipped with suitable seals (not shown) to contain any lubricating fluid. To access the bearing pads 2 for maintenance, a jack 22 is mounted on the Nacelle bedplate, and can be used to raise the main shaft 13 by a sufficient amount to allow one of the lower bearing pads 2 to be removed.

Figure 3:
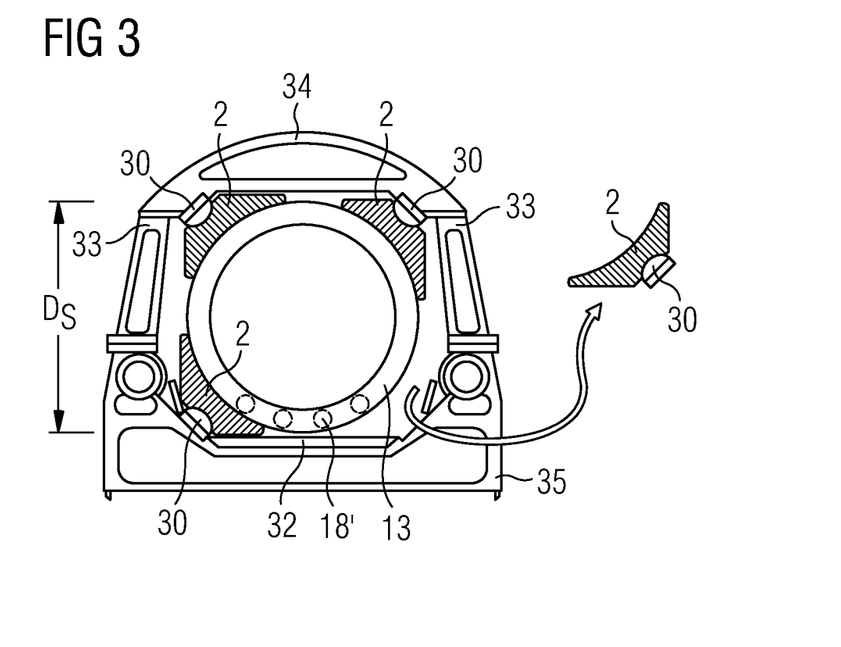
FIG. 3 shows a radial schematic cross-section through relevant parts of the wind turbine in a second embodiment of the invention, showing a bearing housing and a bearing pad removed for maintenance.

FIG. 3 shows a transverse cross-section through relevant parts of a wind turbine 10 according to the invention, showing a bearing housing comprising a roof element 34, side elements 33, and a base element 35. These elements 33, 34 or sections can be favourably dimensioned so that these can be easily lifted, e.g. using the internal crane. The bearing housing in this example contains four bearing pads 2, one of which is removed for maintenance (as indicated by the arrow). The diagram shows the pads 2 arranged around the main shaft 13, and fixed to the bearing housing with ball-and-socket pivot bearings 30. The diagram also shows a series of thrust bearing pads 18' positioned along a lower region of the main shaft 13. Underneath the main shaft 13, a reservoir 32 or sump 32 is placed for collecting the lubricating fluid and returning it to a pump (not shown in the diagram).

Figure 4:
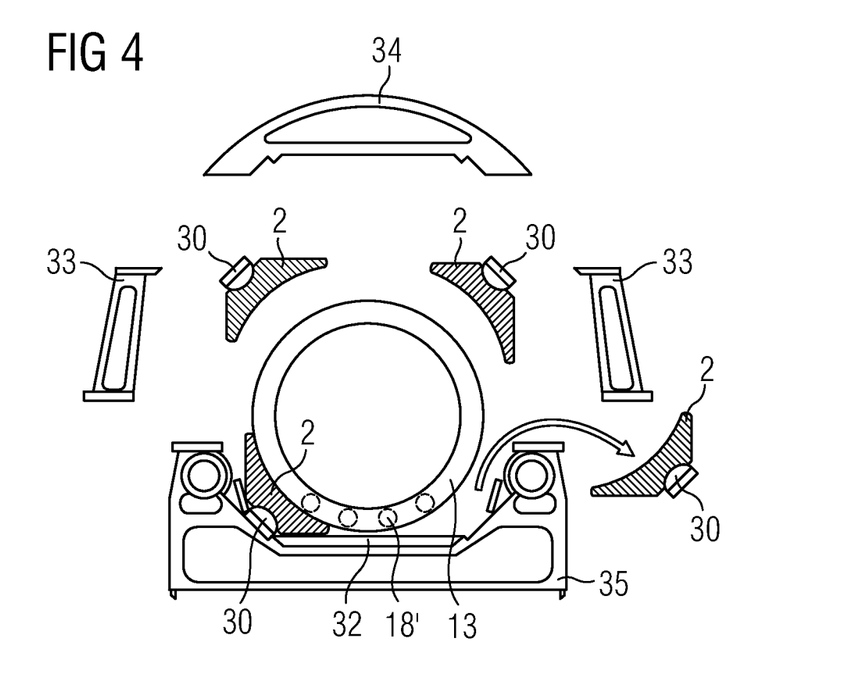
FIG. 4 shows the radial schematic cross-section of FIG. 3 in an exploded view, showing parts of the bearing housing dismantled for maintenance.

FIG. 4 shows an exploded view of the bearing housing described above in FIG. 3. This diagram shows how various elements 33, 34 of the bearing housing can easily be lifted or removed to allow access to the bearing pads 2. Depending on which bearing pad 2 or pads 2 are to be replaced, a side element 33 may be lifted out, or a roof element 34 may be raised. These elements 33, 34 can easily be removed and replaced without the need for an expensive external crane, as described above in the context of maintenance of a conventional wind turbine. The diagram shows, on the right-hand side, a bearing pad 2 removed for replacement or repair (as indicated by the arrow).

Figure 5:
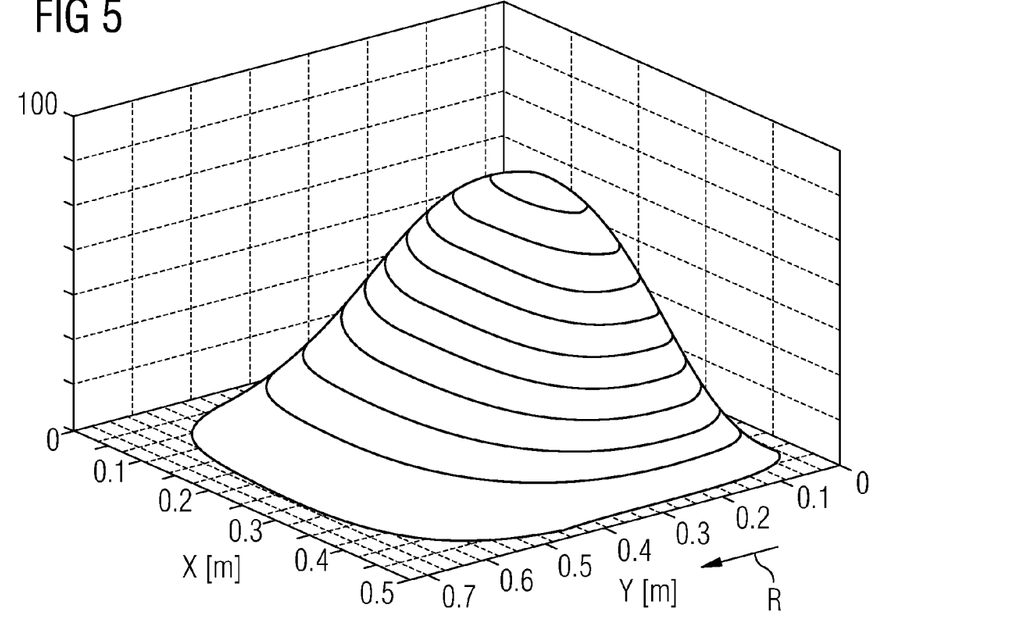
FIG. 5 shows a two-dimensional rendering of a three-dimensional pressure distribution over the inner surface of a bearing pad for a hydrodynamic tilting-pad fluid bearing.

FIG. 5 shows a two-dimensional rendering of a three-dimensional pressure profile over the inner surface of a bearing pad for a hydrodynamic tilting-pad fluid bearing, wherein lubricating fluid is drawn under the bearing pad as the shaft rotates. The X and Y axes represent the width (across the bearing housing) and length (along the perimeter of the main shaft) of the bearing pad respectively. The dimensions shown are only exemplary, and a bearing pad surface of 0.5 m×0.7 m would be sufficient for most wind turbine constructions. To simplify the representation, the 'bearing surface' given by the plane bounded by the X and Y axes is shown to be flat, whereas in reality it would be a curved area to accommodate the curvature of the shaft. The direction of rotation R of the main shaft is given by the arrow parallel to the Y axis, while the 'trailing edge' of the bearing pad coincides with the X axis. As will be known to the skilled person, the pressure profile arises from the difference in speed between pad and shaft, and a converging 'wedge' of pressurized fluid formed between the tilting pad bearing and the rotating shaft. Units of pressure are in MPa (Mega Pascal), and the values shown are again only exemplary. As can be seen from the diagram, a peak in pressure is shown. The position of the peak pressure relative to the bearing pad may depend on the manner in which the bearing pad is connected to the bearing housing, for example on the position of a pivot bearing. The amount of pressure and the pressure distribution that builds up during operation depends on several factors such as the rotational speed of the main shaft and the external forces on the bearing, mainly determined by the wind speed and the rotating mass of the machine carried by the bearing pad.

Figure 6:
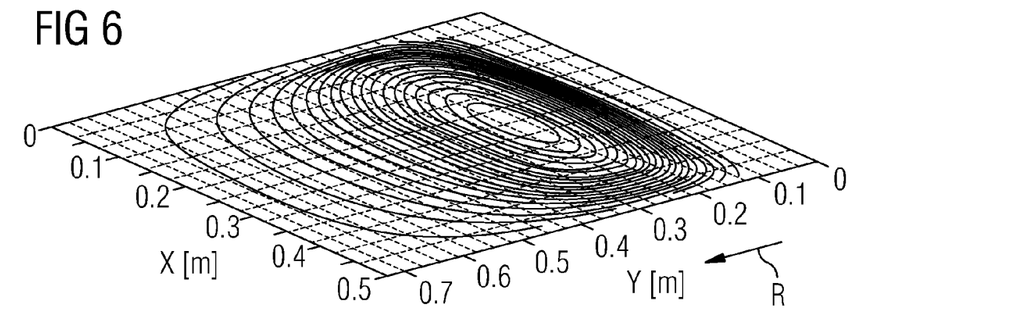
FIG. 6 shows an isobar mapping of the pressure distribution of FIG. 5 onto a surface representing the inner surface of a bearing pad.

FIG. 6 shows an isobar mapping of the pressure distribution of FIG. 5 onto a surface representing the inner surface of a bearing pad. The contour lines exhibit a density towards the trailing edge of the bearing pad, where the pressure increases sharply. Areas of low pressure can be seen towards the edges and corner regions of the bearing pad inner surface, where the isobars or contour lines are spaced further apart.

Figure 7:
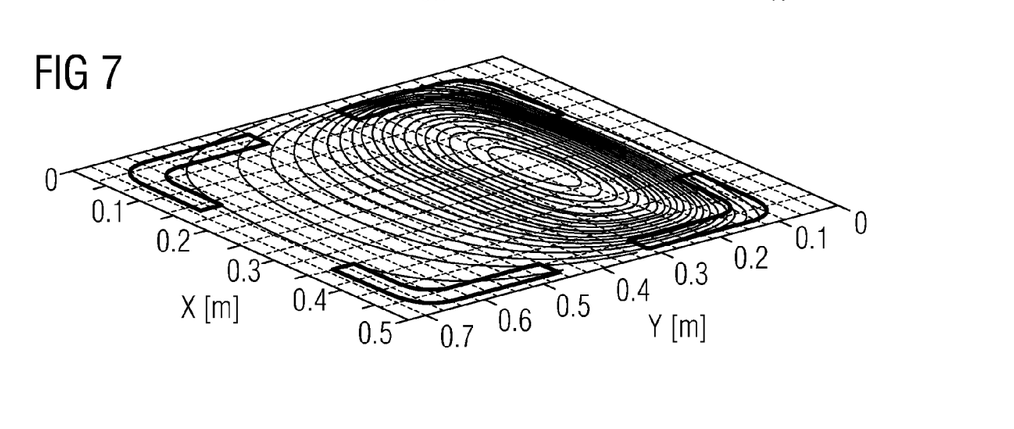
FIG. 7 shows a possible placement of cavities on the inner surface of a bearing pad based on the isobar mapping of FIG. 6.

FIG. 7 shows a possible placement of cavities or recesses on the inner surface of a bearing pad based on the isobar mapping of FIG. 6. As the diagram shows, the recesses largely 'follow' the contours in regions corresponding to lower pressure.

Figure 8:
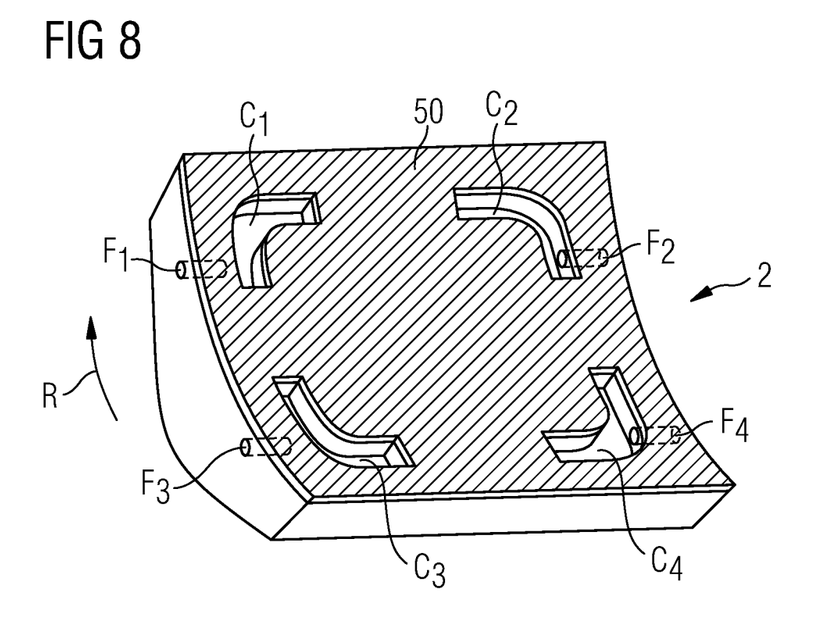
FIG. 8 shows a bearing pad with cavities in the inner surface of the bearing pad placed using the technique described in FIG. 7.

FIG. 8 shows a bearing pad 2 with cavities $C_1$, $C_2$, $C_3$, $C_4$ in the inner surface of the bearing pad 2 placed using the technique described in FIG. 7 above. In this embodiment, the inner surface of the bearing pad 2 is given by a polymer lining 50 with a low module of elasticity. This lining 50 can have a thickness depending on the design requirements. The cavities $C_1$, $C_2$, $C_3$, $C_4$ can extend to a depth of, for example, 5 mm in a bearing pad 2 with a thickness of about 5 cm. For hydrostatic operation, the cavities $C_1$, $C_2$, $C_3$, $C_4$ are fitted with fluid inlets $F_1$, $F_2$, $F_3$, $F_4$ for injecting fluid under high pressure during operation.

Figure 9:
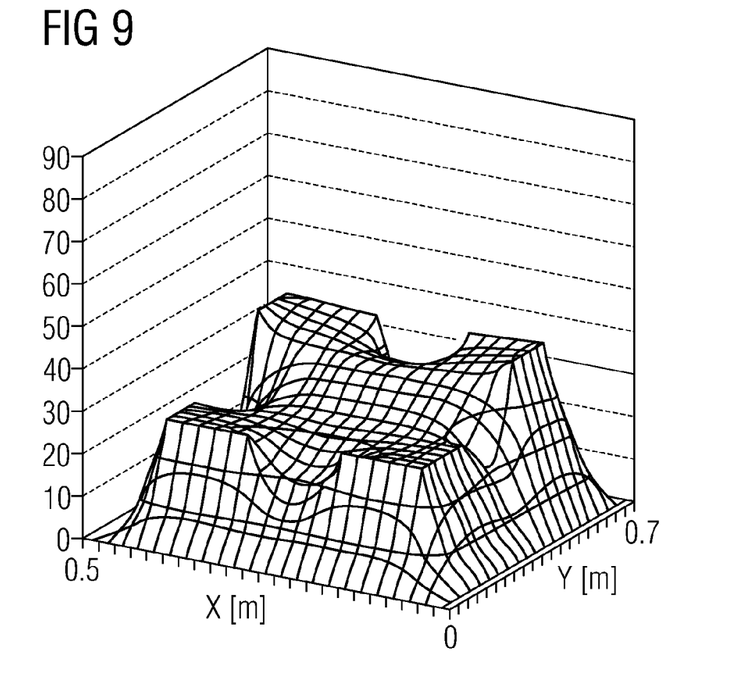
FIG. 9 shows a two-dimensional rendering of a three-dimensional pressure distribution over the inner surface of the bearing pad of FIG. 8 with stationary shaft.

FIG. 9 shows a two-dimensional rendering of a three-dimensional pressure distribution over the inner surface of the bearing pad 2 of FIG. 8 when the shaft is stationary. The diagram shows that, even when stationary, pressure exerted on the bearing pad inner surface is distributed relatively evenly. Regions of highest pressure coincide with the pockets $C_1$, $C_2$, $C_3$, $C_4$, since the fluid is injected in those regions, causing the bearing pad 2 to be pushed away from the main shaft and supported by a film of fluid. This even fluid pressure distribution is particularly advantageous during start-up conditions, since wear owing to friction is considerably reduced. This mode of operation is called hydrostatic operation.

Figure 10:
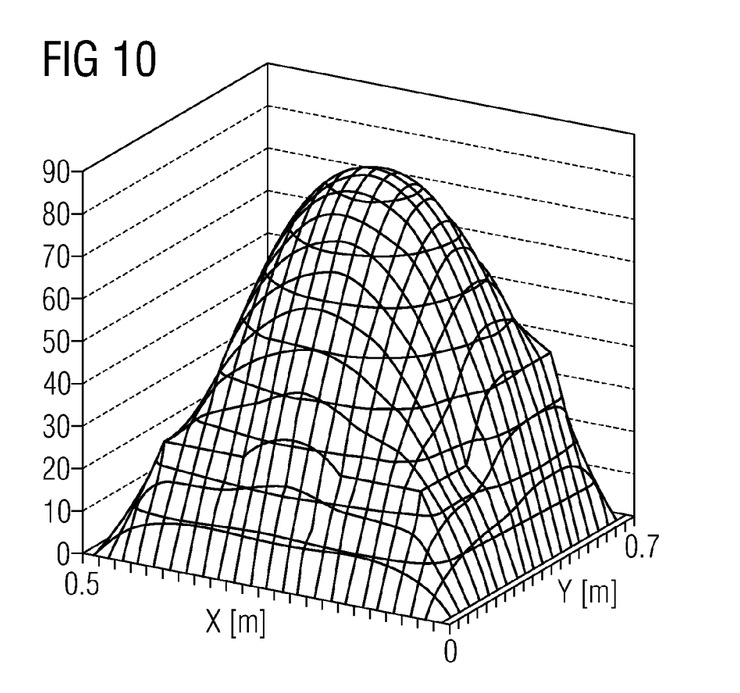
FIG. 10 shows a two-dimensional rendering of a three-dimensional pressure distribution over the inner surface of the bearing pad of FIG. 8 with rotating shaft.

FIG. 10 shows a two-dimensional rendering of a three-dimensional pressure distribution over the inner surface of the bearing pad 2 of FIG. 8 when the shaft is rotating and fluid is injected under high pressure in the cavities. This mode of operation is called hybrid operation and is a combination of hydrostatic and hydrodynamic operation. This diagram shows the advantage of using such cavities to inject fluid during hydrostatic operation. Compared with the hydrodynamic pressure profile of FIG. 5, the hydrostatic pressure profile obtained for the bearing pad with pockets shows that the pressure is more evenly distributed over the inner surface of the bearing pad, and the difference between peak pressure and low pressure regions is reduced.

Figure 11:
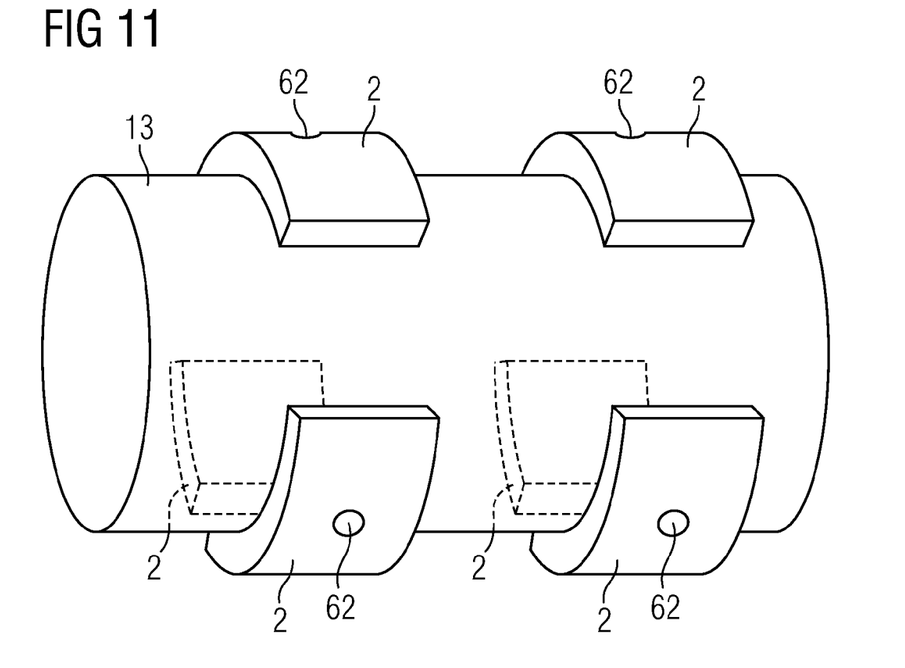
FIG. 11 shows a second arrangement of bearing pads in a fluid bearing according in a further embodiment of the invention.

FIG. 11 shows a very simplified schematic representation of a second arrangement of bearing pads 2 in a tilting-pad fluid bearing for a wind turbine according to the invention. The main shaft 13 is simply represented as a cylinder, but the skilled person will appreciate that its form may deviate considerably from this representation.

In this realization, the bearing pads 2 are realized as curved sections with a pivot bearing between the 'back' of the bearing pad and the inside of the bearing housing (not shown in the diagram), to tiltably fix the bearing pads to the bearing housing. The diagram indicates a socket 62 for such a pivot bearing on the outer surface of each bearing pad 2. The pivot bearing can be a simple ball-and-socket bearing, as will be known to the skilled person. The pivot bearings fix the bearing pads 2 to the bearing housing while allowing the bearing pads 2 to dynamically adjust to the speed of rotation of the main shaft 13 and to the varying forces exerted on the main shaft 13 during operation. The form of the bearing pads 2 may be asymmetrical to adjust to the direction of rotation R of the shaft 13, as described above.

Here, two annular arrangements each comprising three bearing pads 2 are arranged about the main shaft 13 of a wind turbine. Some or all of the bearing pads 2 may feature pockets or cavities as described above. For example, the bearing pads 2 located 'under' the main shaft 13 and carrying its weight, may have pockets for the injection of fluid at high pressure to 'push' the main shaft 13 off the bearing pads 2, while a satisfactory operation may be obtained with pocketless bearing pads 2 'on top' of the main shaft 13.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements. A "unit" or "module" can comprise a number of units or modules, unless otherwise stated.

The invention claimed is:

1. A wind turbine main bearing realized to bear a shaft of a wind turbine, which shaft is caused to rotate by a number of blades connected to the shaft, comprising:
    a fluid bearing with a plurality of bearing pads arranged about the shaft,
    where at least one of the plurality of bearing pads comprising a plurality of cavities located on an inner surface of the bearing pad, wherein at least one of the plurality of cavities comprising, a fluid inlet for the injection of a fluid lubricant to the inner surface of the bearing pad,
    wherein the location of at least one of the cavities is chosen on the basis of specific isobar contours representing regions of low relative pressure on the inner surface of the bearing pad.

2. The wind turbine main bearing according to claim 1, wherein the wind turbine main bearing is realized to bear a shaft with a diameter of at least 40 centimetres, more preferably at least 50 centimetres, and most preferably at least 80 centimetres.

3. The wind turbine main bearing according to claim 1, wherein the wind turbine main bearing is realized such that the bearing pad is tiltable to accommodate a deflection of the shaft.

4. The wind turbine main bearing according to claim 3, further comprising a bearing housing, and wherein at least one of the plurality of bearing pads comprising a pivot bearing to tiltably connect the bearing pad to the bearing housing.

5. The wind turbine main bearing according to claim 1, wherein at least one of the plurality bearing pads has an asymmetrical structure chosen according to a direction of rotation of the shaft.

6. The wind turbine main bearing according to claim 1, wherein the location of at least one of the plurality of cavities is chosen on the basis of a relative pressure distribution on the inner surface of the bearing pad.

7. The wind turbine main bearing according to claim 1, wherein the location of at least one of the cavities corresponds to a region of low relative pressure on the inner surface of the bearing pad.

8. The wind turbine main bearing according to claim 1, wherein at least one annular arrangement of bearing pads is arranged about the shaft.

9. A wind turbine comprising
    a plurality of blades connected to a shaft and realized to rotate the shaft, and
    a main bearing for the shaft according claim 1.

10. A wind turbine according to claim 9, further comprising:
    a number of thrust bearings arranged about the shaft; and,
    a bump stop arranged at a front end of the shaft,
    realized to accommodate a longitudinal movement of the shaft.

11. The wind turbine according to claim 9,
    further comprising a lifting arrangement for raising an element of the wind turbine to facilitate removal, insertion or maintenance of a bearing pad of the wind turbine main bearing.

12. A method of performing maintenance on a wind turbine according to claim 9, comprising:
    halting a rotation of the shaft;
    operating a lifting arrangement to raise the shaft; and
    removing a bearing pad of the wind turbine main bearing from the bearing housing of the wind turbine main bearing.

13. A wind turbine according to claim 9, further comprising:
    a number of thrust bearings arranged about the shaft.

14. A wind turbine main bearing realized to bear a shaft of a wind turbine, which shaft is caused to rotate by a number of blades connected to the shaft, comprising:
    a fluid bearing with a plurality of bearing pads arranged about the shaft, wherein an inner surface of at least one of the bearing pads is lined with a polymer lining.

15. The wind turbine main bearing according to claim 14, wherein at least one of the plurality of bearing pads comprising a plurality of cavities located on an inner surface of the bearing pad, wherein at least one of the plurality of cavities comprising a fluid inlet for the injection of a fluid lubricant to the inner surface of the bearing pad.

\* \* \* \* \*